(12) United States Patent
Cui

(10) Patent No.: US 10,438,466 B2
(45) Date of Patent: Oct. 8, 2019

(54) HUMAN BODY INDUCTION LAMP ALARM DEVICE

(71) Applicant: Ningbo Fiercer Leopard Electrical Appliance Co., Ltd., Ningbo, Zhejiang (CN)

(72) Inventor: Jianqing Cui, Zhejiang (CN)

(73) Assignee: Ningbo Fiercer Leopard Electrical Appliance Co., Ltd., Ningbo (CN)

( * ) Notice: Subject to any disclaimer, the term of this patent is extended or adjusted under 35 U.S.C. 154(b) by 65 days.

(21) Appl. No.: 15/839,840

(22) Filed: Dec. 12, 2017

(65) Prior Publication Data

US 2018/0336769 A1    Nov. 22, 2018

(30) Foreign Application Priority Data

May 19, 2017    (CN) .................... 2017 2 0595540 U

(51) Int. Cl.
| | |
|---|---|
| G08B 13/196 | (2006.01) |
| F21V 33/00 | (2006.01) |
| F21V 21/28 | (2006.01) |
| F21V 23/04 | (2006.01) |
| G08B 13/189 | (2006.01) |
| F21V 29/76 | (2015.01) |
| F21V 21/26 | (2006.01) |
| G03B 15/02 | (2006.01) |
| G08B 15/00 | (2006.01) |
| F21S 8/00 | (2006.01) |

(Continued)

(52) U.S. Cl.
CPC ........ *G08B 13/19697* (2013.01); *F21V 21/26* (2013.01); *F21V 21/28* (2013.01); *F21V 23/0435* (2013.01); *F21V 23/0471* (2013.01); *F21V 29/76* (2015.01); *F21V 29/763* (2015.01); *F21V 33/0076* (2013.01); *G03B 15/02* (2013.01); *G08B 13/189* (2013.01); *G08B 15/00* (2013.01); *G08B 15/008* (2013.01); *F21S 8/033* (2013.01); *F21V 21/30* (2013.01); *F21Y 2115/10* (2016.08)

(58) Field of Classification Search
CPC ................................................. G08B 13/19697
USPC ....................... 362/253; 455/550.1; 340/6.11
See application file for complete search history.

(56) References Cited

U.S. PATENT DOCUMENTS

| | | | | |
|---|---|---|---|---|
| 5,920,270 A | * | 7/1999 | Peterson | ............ G07C 9/00309 |
| | | | | 340/539.1 |
| 2008/0062255 A1 | * | 3/2008 | Gal | ................... G08B 13/19628 |
| | | | | 348/37 |

(Continued)

*Primary Examiner* — Allyson N Trail

(57) ABSTRACT

A human body induction lamp alarm device includes an alarm device body and a remote control sending control signals to the body through an antenna. A power switch and an alarm switch are provided on the remote control. The body includes an installation part and a lamp body part which are connected through a rotating shaft that can rotate along the central axis set horizontally. Two ends of the rotating shaft are respectively connected with the lamp body part and the installation part, the rotating shaft and the flexible connection rotating shaft of the installation part can rotate around the vertical line, an inductive head can be installed in the front of the installation part, the surface of the lamp body part is provided with a lighting assembly, an alarming horn and an indicator light, and the inductive head, lighting assembly, alarming horn and indicator light are connected.

4 Claims, 3 Drawing Sheets

(51) Int. Cl.
*F21V 21/30* (2006.01)
*F21Y 115/10* (2016.01)

(56) References Cited

U.S. PATENT DOCUMENTS

2015/0133193 A1* 5/2015 Stotler ............... G06F 1/163
 455/557
2016/0080855 A1* 3/2016 Greenberg ........... H04R 1/1066
 381/74
2017/0244934 A1* 8/2017 Chien ............... H04N 7/181
2018/0227473 A1* 8/2018 Chen ............... H04N 5/2256

* cited by examiner

HUMAN BODY INDUCTION LAMP ALARM DEVICE

CROSS REFERENCE TO RELATED APPLICATIONS

The present application claims the benefit of Chinese Patent Application No. 201720595540.8 filed on May 19, 2017. All the above are hereby incorporated by reference.

FIELD OF THE INVENTION

The present application relates to a human body induction lamp alarm device.

BACKGROUND

Alarm device is an electronic product that reminds or alerts us to take some actions through voice, light or other forms so as to prevent the consequences of the occurrence of an event, which is divided into mechanical and electronic alarm devices. With the progress of science and technology, more and more mechanical alarm devices are replaced by advanced electronic alarm devices which are often applied in system failure, safety protection, transportation, medical aid, emergency relief, induction detection and other fields. This is closely related to social production such as anti-burglary and anti-theft: in case of illegal burglary, the device will immediately give an alarm through the high decibel horn of the main body or the connected alarming horn on the site, and send alarm signals outwards.

Currently, most of the existing alarm devices on the market adopt human body-triggered alarm which is easy to control and realize the warning function. But such alarm device has some defects: 1. When the burglar finds that there is an alarm device, he or she may easily avoid the alarm device and close it through the switch on the device, causing it to lose its warning function. 2. The working conditions of the alarm device are nonadjustable, thus it is unable to adapt to the environment well.

SUMMARY

The object of the present application is to provide a human body induction lamp alarm device, equipped with a remote control for controlling. The lamp can be lightened at the same time when the alarm rings so as to clearly capture the image of the burglar and be used as an induction lamp.

The technical solution adopted in the present application to solve the technical problem is as follows: a human body induction lamp alarm device, comprising an alarm device body and a remote control sending control signals to the body through an antenna. A power switch and an alarm switch are provided on the remote control, and the body comprises an installation part and a lamp body part which are connected through a rotating shaft that can rotate along the central axis set horizontally, the two ends of the rotating shaft are respectively connected with the lamp body part and the installation part, the rotating shaft and the flexible connection rotating shaft of the installation part can rotate around the vertical line, an inductive head can be installed in the front of the installation part, the surface of the lamp body part is provided with a lighting assembly, an alarming horn and an indicator light, and the inductive head, lighting assembly, alarming horn and indicator light are connected through a control circuit.

A further preferred solution of the present application: the lamp body part is of similarly rectangular structure and the installation part is of similarly waist shape, and the former is in the upper front of the latter. A time knob, a distance knob and a LUX knob connected with the control circuit are provided at the bottom of the inductive head. Such arrangement of the lamp body part structure and the installation part structure offers a beautiful appearance and can adapt to the working environment. The time knob is set to adjust the time of the lighting assembly for illuminating the environment when the inductive head detects a person, the distance knob is set to adjust the induction distance of the inductive head, and the LUX knob is set to automatically detect daytime and nighttime and can be adjusted to set the working time of the lighting assembly.

A further preferred solution of the present application: the lighting assembly comprises three lampshades arranged on the surface of the lamp body part in parallel and a LED lamp installed in the lampshade. The lighting assembly works and illuminates the environment for the convenience of capturing the image of the burglar.

A further preferred solution of the present application: the alarming horn is installed below the lighting assembly, and the indicator light is on one side of the alarming horn. When the warning function is opened, the alarming horn can give an alarm in time to alert the user. The indicator light is used to display if the warning function of the present application is opened.

A further preferred solution of the present application: the back side of the installation part fits the wall for installation and connection, and the back side of the lamp body part is bestrewn with cooling fins arranged vertically.

Compared with the prior art, the advantage of the present application is that the detection function of the alarm device body, the function of illuminating the environment, the warning function and the status display function are realized by setting the inductive head, lighting assembly, alarming horn and indicator light which are connected by the internal control circuit. The installation part and the lamp body part in the present application are connected through a rotating shaft that can rotate along the central axis set horizontally, and the rotating shaft and the flexible connection rotating shaft of the installation part can rotate around the vertical line, so as to adjust the angle of the illumination surface. An inductive head can be installed in the front of the installation part by rotation, so as to adjust the induction angle of the inductive head. The power switch and the alarm switch are not set on the alarm device body, instead, they are set on the remote control and control signals are sent to the body through an antenna. Thus, the safety performance of the present application is improved. As long as a person appears within the detection range, the product provided in the present application will give an alarm automatically. A wireless alarm switch function is designed. The lamp will be lightened at the same time when the alarm device rings, so as to clearly capture the image of the burglar and be used as an induction lamp.

DETAILED DESCRIPTION

Below are detailed descriptions of the present application in combination with the attached drawings.

To clarify the object, technical solutions and advantages of the present application, detailed descriptions of the present application are made in combination with the attached drawings and embodiments as follows. It should be understood that the specific embodiments described herein are only used to explain rather than define the present application.

Figure 1:
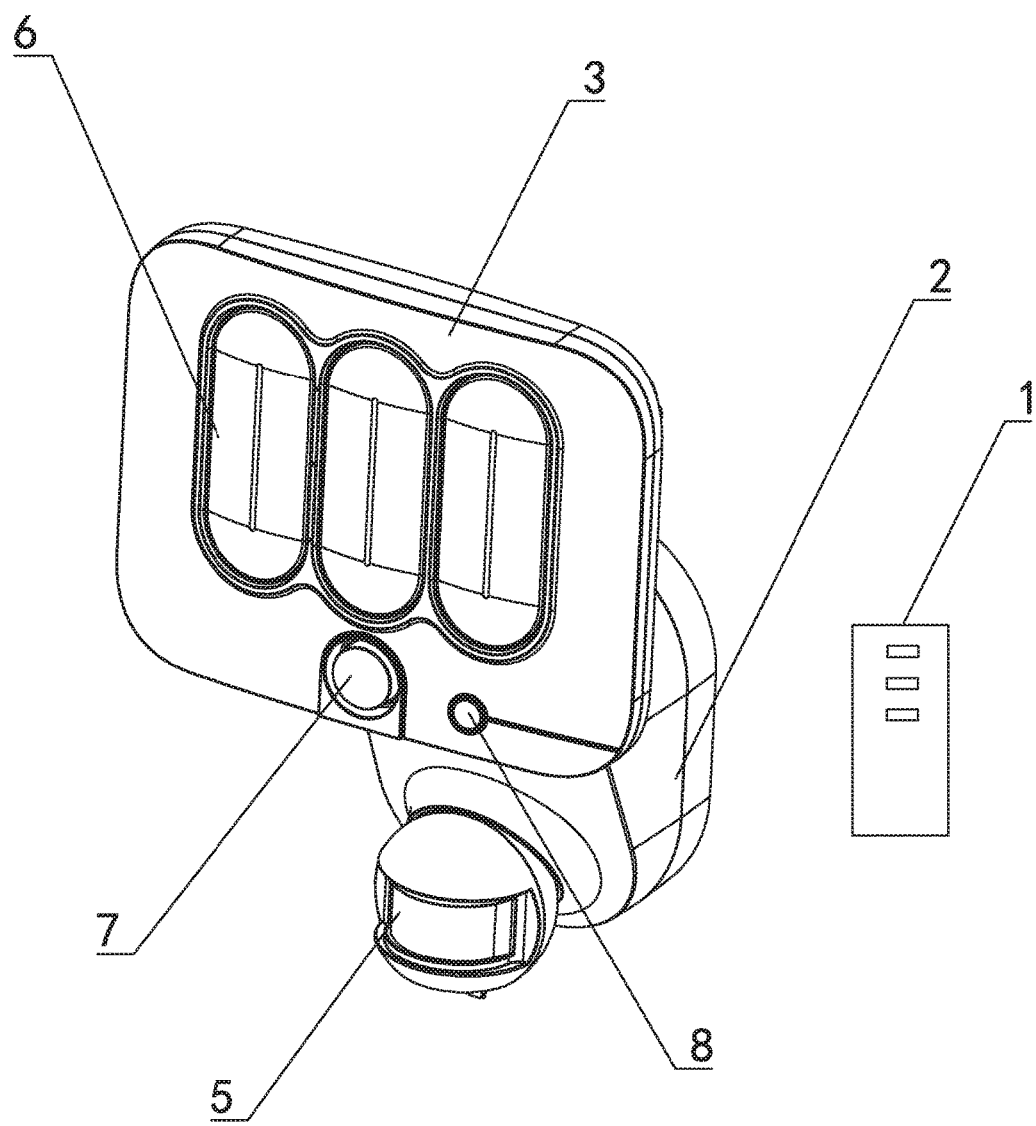
FIG. 1 is a structure diagram of the present application.
Figure 2:
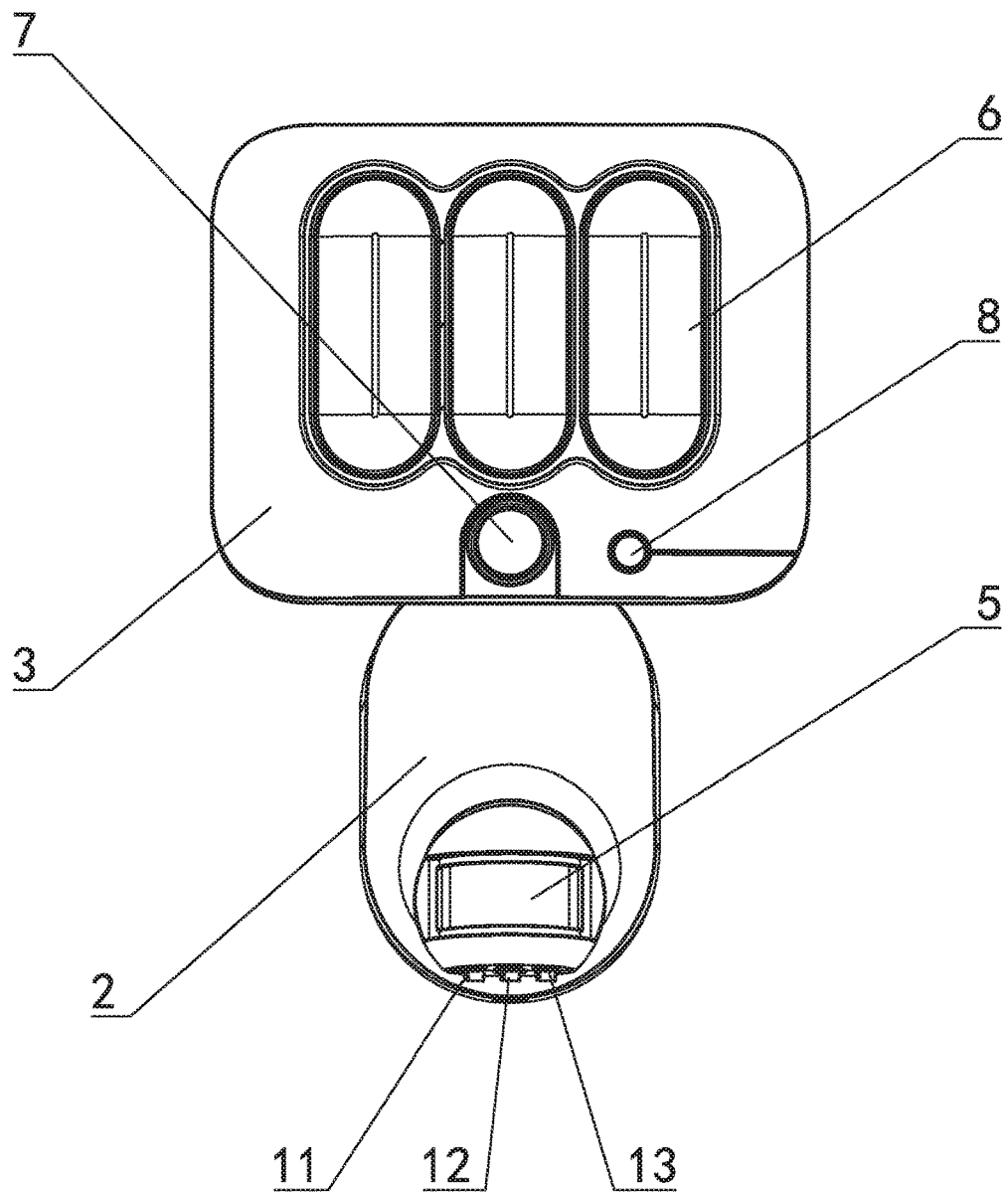
FIG. 2 is a front view of the alarm device body.
Figure 3:
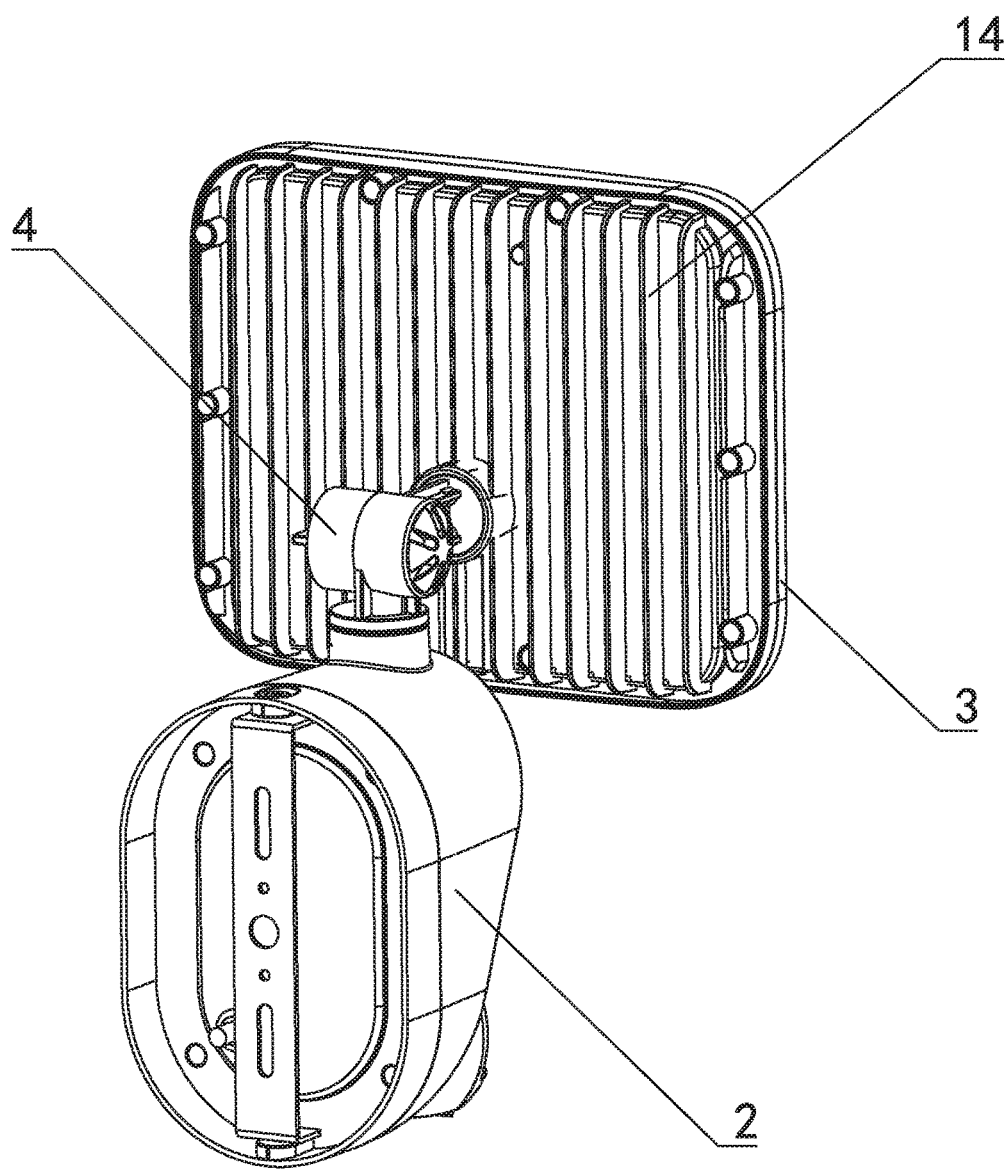
FIG. 3 is a rear view of the alarm device body.

Referring to FIG. 1 to FIG. 3, a human body induction lamp alarm device, comprising an alarm device body and a remote control 1 sending control signals to the body through an antenna, a power switch and an alarm switch are provided on the remote control 1, and the body comprises an installation part 2 and a lamp body part 3 which are connected through a rotating shaft 4 that can rotate along the central axis set horizontally, the two ends of the rotating shaft 4 are respectively connected with the lamp body part 3 and the installation part 2, the rotating shaft 4 and the flexible connection rotating shaft 4 of the installation part 2 can rotate around the vertical line, an inductive head 5 can be installed in the front of the installation part 2, the surface of the lamp body part 3 is provided with a lighting assembly 6, an alarming horn 7 and an indicator light 8, and the inductive head 5, lighting assembly 6, alarming horn 7 and indicator light 8 are connected through a control circuit.

The lamp body part 3 is of similarly rectangular structure and the installation part 2 is of similarly waist shape, and the former is in the upper front of the latter. A time knob 11, a distance knob 12 and a LUX knob 13 connected with the control circuit are provided at the bottom of the inductive head 5.

The lighting assembly 6 comprises three lampshades arranged on the surface of the lamp body part 3 in parallel and a LED lamp installed in the lampshade.

The alarming horn 7 is installed below the lighting assembly 6, and the indicator light 8 is on one side of the alarming horn 7.

The back side of the installation part 2 fits the wall for installation and connection, and the back side of the lamp body part 3 is bestrewn with cooling fins 14 set vertically.

What described above are only the preferred embodiments of the present application, which are not used to restrict the present application. Any modification, equivalent substitution and improvement without departing from the spirit and principle of the present application shall fall within the scope of protection of the present application.

What is claimed is:

1. A human body induction lamp alarm device, comprising an alarm device body and a remote control sending control signals to the body through an antenna, wherein a power switch and an alarm switch are provided on the remote control, and the body comprises an installation part and a lamp body part which are connected through a rotating shaft that can rotate along a central axis set horizontally, wherein two ends of the rotating shaft are respectively connected with the lamp body part and the installation part, the rotating shaft and a flexible connection rotating shaft of the installation part can rotate around a vertical line, an inductive head is installed in the front of the installation part, the surface of the lamp body part is provided with a lighting assembly, an alarming horn and an indicator light, and the inductive head, lighting assembly, alarming horn and indicator light are connected through a control circuit;

wherein the lamp body part is of similarly rectangular structure and the installation part is of similarly waist shape, and the lamp body part is in the upper front of the installation part, and a time knob, a distance knob and a LUX knob connected with the control circuit are provided at the bottom of the inductive head.

2. The human body induction lamp alarm device according to claim 1, wherein the lighting assembly comprises three lampshades arranged on the surface of the lamp body part in parallel and a LED lamp installed in the lampshade.

3. The human body induction lamp alarm device according to claim 1, wherein the alarming horn is installed below the lighting assembly, and the indicator light is on one side of the alarming horn.

4. The human body induction lamp alarm device according to claim 1, wherein the back side of the installation part fits the wall for installation and connection, and the back side of the lamp body part is bestrewn with cooling fins arranged vertically.

* * * * *